United States Patent
Srinivas (10) Patent No.: US 12,219,418 B2
(45) Date of Patent: Feb. 4, 2025

(54) HIGH-AVAILABILITY CONNECTIONS USING DYNAMIC TRANSPARENT BRIDGING

(71) Applicant: ARRIS ENTERPRISES LLC, Suwanee, GA (US)

(72) Inventor: Geethanjali Srinivas, Bangalore (IN)

(73) Assignee: Ruckus IP Holdings LLC, Claremont, NC (US)

( * ) Notice: Subject to any disclaimer, the term of this patent is extended or adjusted under 35 U.S.C. 154(b) by 0 days.

(21) Appl. No.: 18/699,028

(22) PCT Filed: Sep. 30, 2022

(86) PCT No.: PCT/US2022/077341
§ 371 (c)(1),
(2) Date: Apr. 5, 2024

(87) PCT Pub. No.: WO2023/060016
PCT Pub. Date: Apr. 13, 2023

(65) Prior Publication Data
US 2024/0414618 A1    Dec. 12, 2024

(30) Foreign Application Priority Data

Oct. 6, 2021   (IN) .............................. 202121045441

(51) Int. Cl.
*H04W 36/22*    (2009.01)
*H04W 36/14*    (2009.01)
*H04W 84/12*    (2009.01)

(52) U.S. Cl.
CPC ........... *H04W 36/22* (2013.01); *H04W 36/14* (2013.01); *H04W 84/12* (2013.01)

(58) Field of Classification Search
CPC ...... H04W 36/22; H04W 36/14; H04W 84/12
See application file for complete search history.

(56) References Cited

U.S. PATENT DOCUMENTS

2006/0039337 A1   2/2006   Hodoshima
2008/0253314 A1   10/2008  Stephenson et al.
(Continued)

FOREIGN PATENT DOCUMENTS

WO    2011144127 A2    11/2011

OTHER PUBLICATIONS

"Kreutz et al., Software-Defined Networking: A Comprehensive Survey; Published In: 1-20 Proceedings of the IEEE (vol. 103, Issue: 1, Jan. 2015); pp. 14-76; Date of Publication: Dec. 19, 2014; retrieved on [Nov. 22, 2022]; retrieved from the int".
(Continued)

*Primary Examiner* — Mohammad S Anwar
(74) *Attorney, Agent, or Firm* — Steven Stupp (57) ABSTRACT

An electronic device may establish a standby network having a service set identifier (SSID). Moreover, the electronic device may receive, from a controller, information specifying neighbors of the electronic device, where the neighbors are within wireless communication range of the electronic device and include a second electronic device. When the electronic device is unable to communicate with the controller, the electronic device may select the second electronic device from the neighbors, where the second electronic device implements a second instance of the standby network having the SSID. Then, the electronic device may provide a message to the second electronic device. Moreover, the electronic device may receive a response to the message from the second electronic device. Next, the electronic device may providing a transparent bridge with the second electronic device using the standby network, where the transparent bridge provides communication of management traffic between the electronic device and the controller.

20 Claims, 5 Drawing Sheets

(56) References Cited

U.S. PATENT DOCUMENTS

| | | |
|---|---|---|
| 2012/0250600 A1 | 10/2012 | Aragon et al. |
| 2014/0269652 A1* | 9/2014 | Buesker ............ H04L 12/40195 |
| | | 370/338 |
| 2015/0049616 A1* | 2/2015 | Ho ........................ H04W 28/18 |
| | | 370/254 |
| 2016/0262163 A1* | 9/2016 | Gonzalez Garrido ...................... |
| | | H04W 72/541 |
| 2017/0245211 A1 | 8/2017 | Patil et al. |
| 2021/0274582 A1* | 9/2021 | Venkatachalam ..... H04W 24/04 |

OTHER PUBLICATIONS

"Kumar Point to Point Ethernet Transmission Wireless Backhaul Links ClusterIng; 1-20 Wireless/Mobile Multimedia Networks—COEN 332; arXiv:2106.14315v1 [cs.NI] Jun. 27, 2021; retrieved on [Nov. 22, 2022]; retrieved from the internet <URL: https:/larxiv.orgfpdf".

"Notification of Transmittal of the International Search Report and the Written Opinion of the International Searching Authority, or the Declaration for corresponding International Application No. PCT/US2022/077341, mailing date: Jan. 20, 2023 (11 pages)".

* cited by examiner

FIG. 5

HIGH-AVAILABILITY CONNECTIONS USING DYNAMIC TRANSPARENT BRIDGING

CROSS REFERENCE TO RELATED APPLICATIONS

This application claims priority under 35 U.S.C. § 371 to International Patent Application No. PCT/US2022/077341, "High-Availability Connections Using Dynamic Transparent Bridging," by Geethanjali Srinivas, filed on Sep. 30, 2022, which claims priority under 35 U.S.C. 119(e) to India Provisional Application Serial Number 202121045441, "High-Availability Connections Using Dynamic Transparent Bridging," filed on Oct. 6, 2021, by Geethanjali Srinivas, the contents of both of which are herein incorporated by reference.

BACKGROUND

Field

The described embodiments relate to techniques for providing high-availability connections in a network using dynamic transparent bridging.

Related Art

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

Because of these capabilities, wireless networks have become common in enterprise, hospitality, and education sectors. These wireless networks facilitate a variety of applications, such as: streaming, gaming, social media, the Internet of things (IoT) and/or mission-critical applications. Consequently, it is increasingly important to provide redundancy in wireless networks using high-availability deployments, so that users enjoy seamless connectivity.

However, link failures in a wireless network may eliminate communication between communication network devices (such as access points, switches or routers) and their controller (which may provide configuration information, firmware upgrades, etc.). While a communication network device is unable to reach its controller, the communication network device may shut down. Consequently, the communication performance of the wireless network and applications (such as mission-critical applications) may be degraded, e.g., because of increased latency.

Several existing approaches attempt to provide failover redundancy for communication network devices that are managed by controllers. For example, when the controller cannot be reachable, the communication network devices may failover to another controller with minimal impact on client connectivity. However, this approach typically requires that a customer invests in standby controllers to be deployed in a (N+1) or (1+1) configuration. Moreover, this approach may only help when the controller is not reachable by all the communication network devices and, thus, may not help in the event of a localized link or connection failure.

Alternatively, in another existing approach, link aggregation based on the Ethernet ports of communication network devices may be used to ensure redundancy when a controller is unreachable. Typically, link aggregation involves the use of a Link Aggregation Control Protocol (LACP). However, the use of LACP for redundancy may restrict the capabilities of the communication network devices. Notably, the use of LACP for redundancy may prevent a communication network device from performing load balancing.

SUMMARY

An electronic device that provides a dynamic transparent bridge is described. This electronic device may include: one or more interface circuits that communicate with a controller of the electronic device in a network and a second electronic device in the network. During operation, the electronic device establishes a standby network having a selective service set identifier (SSID). Moreover, the electronic device receives, associated with the controller, information specifying neighboring electronic devices of the electronic device, where the neighboring electronic devices are within wireless communication range of the electronic device, and the neighbor electronic devices include the second electronic device. When the electronic device is unable to communicate with the controller, the electronic device selects the second electronic device in the neighbor electronic devices, where the second electronic device implements a second instance of the standby network having the SSID. Then, the electronic device provides a message (such as a page) addressed to the second electronic device. Moreover, the electronic device receives a response to the message associated with the second electronic device. Next, the electronic device provides the transparent bridge with the second electronic device using the standby network, where the transparent bridge at least provides communication of management traffic between the electronic device and the controller via the second electronic device.

Note that the electronic device may include an access point. Moreover, the second electronic device may include another access point.

Furthermore, the electronic device may determine when the controller is unavailable based at least in part on one or more keepalive messages that are not received from the controller.

Additionally, the electronic device may perform a handover of traffic associated with one or more clients of the electronic device to the second electronic device, where performing the handover includes dynamically forwarding the traffic to the second electronic device using the standby network.

In some embodiments, the electronic device rejects a request associated with a third electronic device, which is different from an access point, to associate with the standby network.

Moreover, when the electronic device is able to communicate with the controller, the electronic device may discontinue providing the transparent bridge.

Another embodiment provides the second electronic device that performs counterpart operations to at least some of the aforementioned operations of the electronic device.

Another embodiment provides the controller that performs counterpart operations to at least some of the aforementioned operations of the electronic device.

Another embodiment provides a system that includes the electronic device, the second electronic device and/or the controller.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device (such as an access point) that provides a dynamic transparent bridge is described. During operation, the electronic device may establish a standby network having an SSID. Moreover, the electronic device may receive, from a controller, information specifying neighboring electronic devices of the electronic device, where the neighboring electronic devices are within wireless communication range of the electronic device, and the neighboring electronic devices include a second electronic device (which may include a second instance of an access point). When the electronic device is unable to communicate with the controller, the electronic device may select the second electronic device from the neighboring electronic devices, where the second electronic device implements a second instance of the standby network having the SSID. Then, the electronic device may provide a message (such as a page) to the second electronic device. Moreover, the electronic device may receive a response to the message from the second electronic device. Next, the electronic device may provide the transparent bridge with the second electronic device using the standby network, where the transparent bridge at least provides communication of management traffic between the electronic device and the controller via the second electronic device.

By dynamically providing the transparent bridge, these communication techniques may provide communication redundancy. This communication redundancy may be accessed in real-time, and may not require the use of multiple standby controllers and/or link aggregation. Therefore, the communication techniques may be able to prevent traffic disruption even when there is a local link or connection failure. Moreover, the communication techniques may provide communication redundancy without restricting the ability of the electronic device to perform load balancing. Consequently, the communication techniques may improve the communication performance in a wireless network and, thus, may improve the user experience when using in the wireless network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

Figure 1:
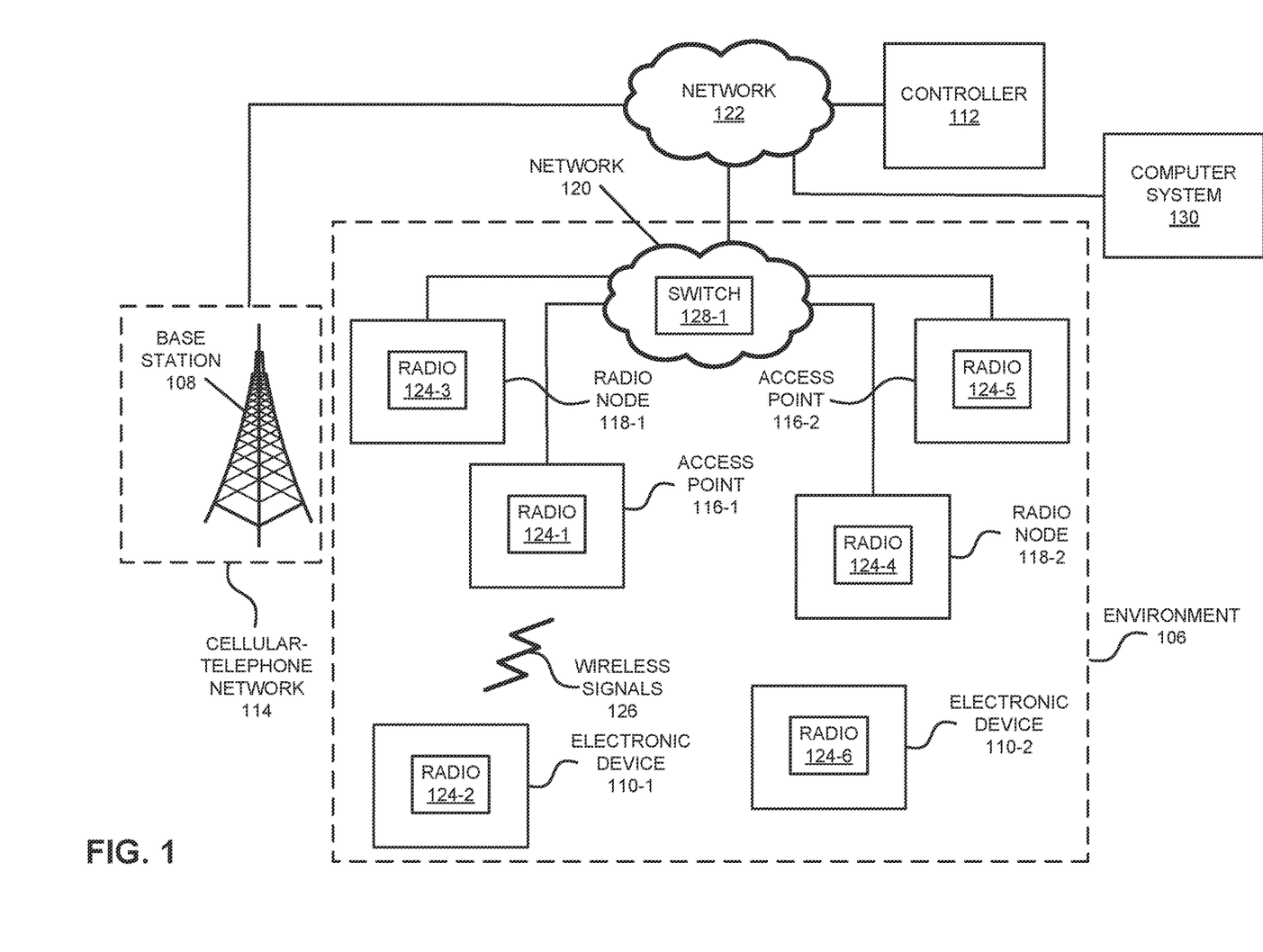
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a cloud-based controller that manages and/or configures access points 116, radio nodes 118 and/or switch 128-1) and/or computer system 130 (that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128-1).

As described further below with reference to FIG. 6, electronic devices 110, computer 112, access points 116, radio nodes 118, switch 128-1 and computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, link failures in a wireless network may disrupt communication with controller 112 and, more generally, in network 120 and/or network 122. Moreover, as described further below with reference to FIGS. 2-4, these problems may be addressed using the communication techniques. While the communication techniques may be performed by a variety of communication network devices in FIG. 1, in the discussion that follows the communication techniques are illustrated using access points 116.

Notably, in the communication techniques, access points 116 (such as access points in a zone) may each establish a standby network having a SSID. Moreover, a given access point (such as access point 116-1) may provide information specifying coverage of proximate access points 116 (e.g., based at least in part on a received signal strength or RSSI from the proximate access points 116) to controller 112. Controller 112 may aggregate this information from multiple access points 116 into a list of neighboring electronic devices (such as neighboring access points) as a function of geographic location. In the present discussion, a 'neighboring access point' may be within wireless range of the given access point, such as access point 116-1. Furthermore, controller 112 may disseminate information specifying the neighboring access points to access points 116. For example, the neighboring access points of access point 116-1 may include access point 116-2.

Subsequently, when access point 116-1 is unable to communicate with controller 112 (e.g., when access point 116-1 does not receive one or more keepalive messages from controller 112 within a prescribed time interval, such as 1, 3, 5, 10 or 30 s) and, more generally, when communication in network 120 is degraded or disrupted, access point 116-1 may access stored information specifying the neighboring access points and may select assess point 116-2 in the neighboring access points.

Then, access point 116-1 may provide a message (such as a page) to access point 116-2. For example, access point 116-1 may request that access point 116-2 forward traffic for access point 116-1, which is received using the standby network having the SSID. Thus, access point 116-1 may function as a transparent bridge for selected traffic associated with access point 116-1 (such as management frames or packets communicated with controller 112) or for traffic associated with some or all of the clients that are associated with or connected to access point 116-1 (such as electronic device 110-1).

Moreover, access point 116-1 may receive a response to the message from access point 116-2. This response may indicate that access point 116-2 will forward the traffic for access point 116-1.

Next, access point 116-1 may provide the transparent bridge with access point 116-2 using the standby network, where the transparent bridge at least provides communication of the management traffic between access point 116-1 and controller 112 via access point 116-2. Moreover, in some embodiments, access point 116-1 may perform a handover of traffic associated with one or more clients of access point 116-1 (such as traffic, e.g., one or more packets or frames, associated with electronic device 110-1) to access point 116-2, where performing the handover includes dynamically forwarding the traffic to access point 116-2 using the standby network.

Furthermore, when access point 116-1 is able to communicate with controller 112 (e.g., when access point 116-1 receives a keepalive message from controller 112), access point 116-1 may discontinue providing the transparent bridge. Notably, access point 116-1 may provide a notification to access point 116-2, so that access point 116-2 no longer forwards traffic received from access point 116-1 using the standby network having the SSID. Then, access point 116-1 may revert to communicating the management traffic with controller 112 and/or the traffic associated with one or more clients of access point 116-1.

Note that the standby network having the SSID may only be selected used by access points 116. This may be accomplished by access points 116 not broadcasting beacons with the SSID. Instead, media access control (MAC) filtering may be used for the SSID. For example, controller 112 may provide MAC-filter tables to access points 116, so that a given access points only accepts or responds to certain association requests based on the MAC address of the source(s), such as certain access points 116. Alternatively, in embodiments where access points 116 broadcast beacons with the SSID, access points 116 may deny probe requests from clients (such as electronic device 110-1) that include the SSID. For example, access point 116-1 may rejects a request (such as a probe request), from electronic device 110-1 and, more generally, from an electronic device that different from or is not one of access points 116, to associate with the standby network.

In these ways, the communication techniques may provide communication redundancy to access point 116-1. Notably, by dynamically providing the transparent bridge, the communication techniques may provide real-time communication redundancy without requiring the use of multiple standby controllers and/or link aggregation. Stated differently, the communication techniques may provide communication redundancy using a dynamic mesh network in which the mode of a given access point can be changed (e.g., from a normal mode to a mode in which the standby network is used while the given access point provides a transparent bridge). Therefore, the communication techniques may be able to prevent traffic disruption even when there is a local link or connection failure. Moreover, the communication techniques may provide communication redundancy without restricting the ability of access points 116 to perform load balancing. Consequently, the communication techniques may improve the communication performance in a wireless network (such as network 120) and, thus, may improve the user experience when using in the wireless network.

While the preceding discussion illustrated the communication techniques with a centrally aggregated and disseminated list of neighboring access points from controller 112, in other embodiments at least some of the operations in the communication techniques may be performed in a distributed manner. For example, access point 116-1 may determine the neighboring accessing points without receiving information from controller 112. Instead, access point 116-1 may determine the neighboring access points based at least in part on received wireless signals from the neighboring access points, such as received beacons. In some embodiments, access points 116 may collaboratively determine the neighboring access points for a given access point (such as access point 116-1) by exchanging information about the wireless signals from access points 116 that they receive.

Moreover, while the preceding discussion illustrated the communication techniques with communication between access point 116-1 and the controller, in other embodiments the communication techniques may be used to provide a transparent bridge when communication between access point 116-1 and an arbitrary computer, computer system or electronic device is unavailable, is disrupted or has degraded communication performance (e.g., relative to a baseline communication-performance metric, such as the throughput).

Furthermore, while the preceding discussion illustrated the communication techniques with access point 116-1 determining when controller 112 is unavailable and then providing the transparent bridge, in other embodiments these operations may be performed by another component. For example, when controller 112 determines that it is unable to communicate with access point 116-1 (such as when one or more keepalive messages from access point 116-1 are not received with a time interval), controller 112 may access the list of neighboring access points and may select access point 116-2. Then, controller 112 may instruct access point 116-2 to forward traffic for access point 116-1. After receiving this instruction, access point 116-2 may communicate with access point 116-1, so that access point 116-1 establishes or provides the transparent bridge.

In some embodiments, access point 116-2 may attempt to communicate with access point 116-1 using wired communication. When a wired-communication link is unavailable, access point 116-2 may communicate with access point 116-1 using wireless communication via the standby network.

Figure 2:
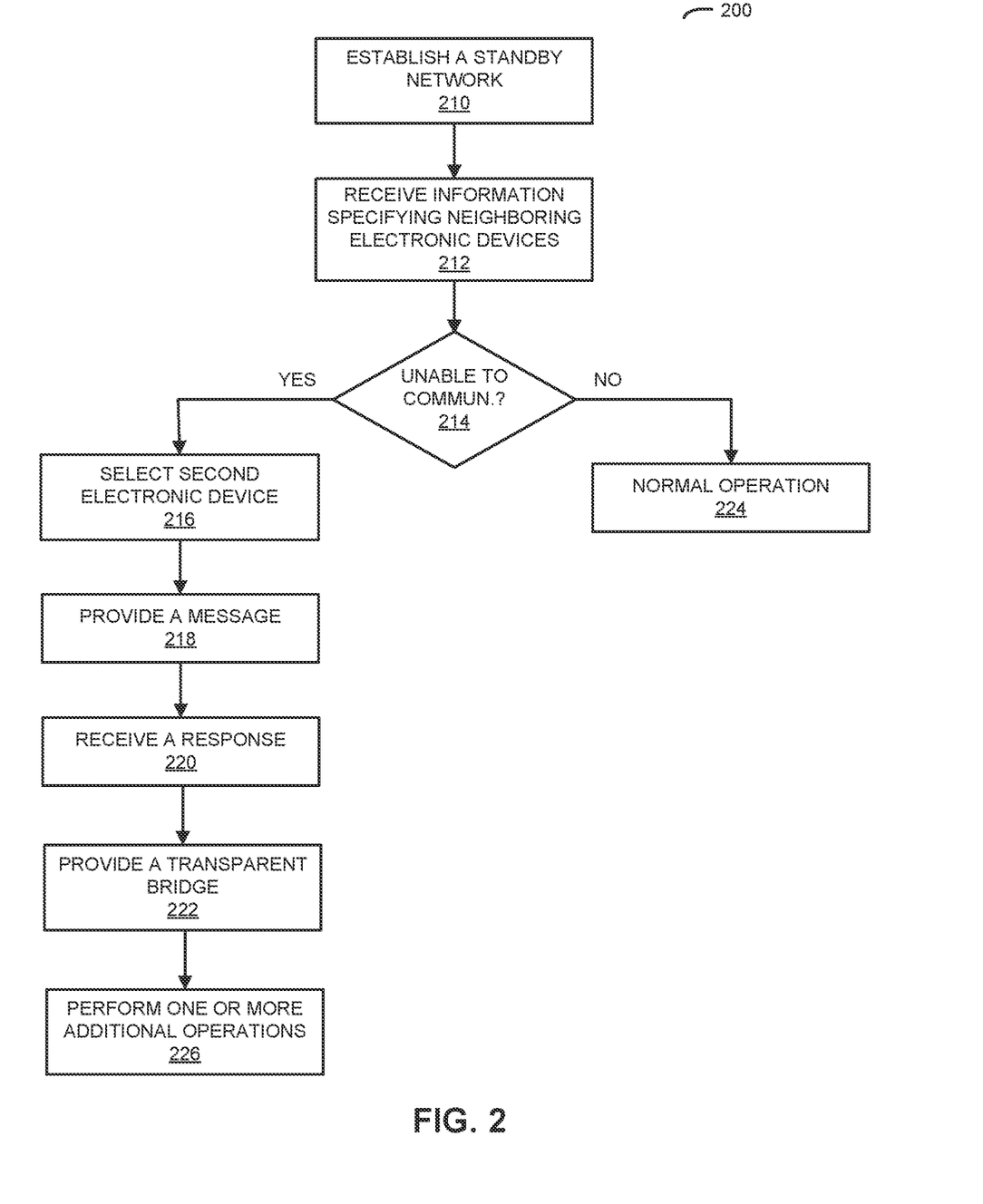
FIG. 2 is a flow diagram illustrating an example of a method for providing a dynamic transparent bridge using an electronic device in FIG. 1 in accordance with an embodiment of the present disclosure.

We now describe embodiments of the method. FIG. 2 presents a flow diagram illustrating an example of a method 200 for providing a transparent bridge, which may be performed by an electronic device, such as one of access points 116, one of radio nodes 118 or switch 128-1 in FIG. 1. During operation, the electronic device may establish a standby network (operation 210) having a SSID. Note that the electronic device may include an access point.

Moreover, the electronic device may receive, associated with the controller, information specifying neighboring electronic devices (operation 212) of the electronic device, where the neighboring electronic devices are within wireless communication range of the electronic device, and the neighbor electronic devices include the second electronic device. Note that the second electronic device may include another access point, which is different from the access point.

When the electronic device is unable to communicate with the controller (operation 214), the electronic device may select the second electronic device (operation 216) in the neighbor electronic devices, where the second electronic device implements a second instance of the standby network having the SSID. For example, the electronic device may determine when the controller is unavailable based at least in part on one or more keepalive messages that are not received from the controller.

Then, the electronic device may provide a message (operation 218) addressed to the second electronic device. Moreover, the electronic device may receive a response (operation 220) to the message associated with the second electronic device. Next, the electronic device may provide the transparent bridge (operation 222) with the second electronic device using the standby network, where the transparent bridge at least provides communication of management traffic between the electronic device and the controller via the second electronic device.

Otherwise, when the electronic device is able to communicate with the controller (operation 214), the electronic device may continue with normal operation (operation 224).

In some embodiments, the electronic device may optionally perform one or more additional operations (operation 226). For example, the electronic device may perform a handover of traffic associated with one or more clients of the electronic device to the second electronic device, where performing the handover includes dynamically forwarding the traffic to the second electronic device using the standby network.

Moreover, the electronic device rejects a request associated with a third electronic device, which is different from an access point, to associate with the standby network.

Furthermore, when the electronic device is able to communicate with the controller, the electronic device may discontinue providing the transparent bridge.

In some embodiments of method 200, there may be additional or fewer operations. Furthermore, the order of the operations may be changed, and/or two or more operations may be combined into a single operation.

Figure 3:
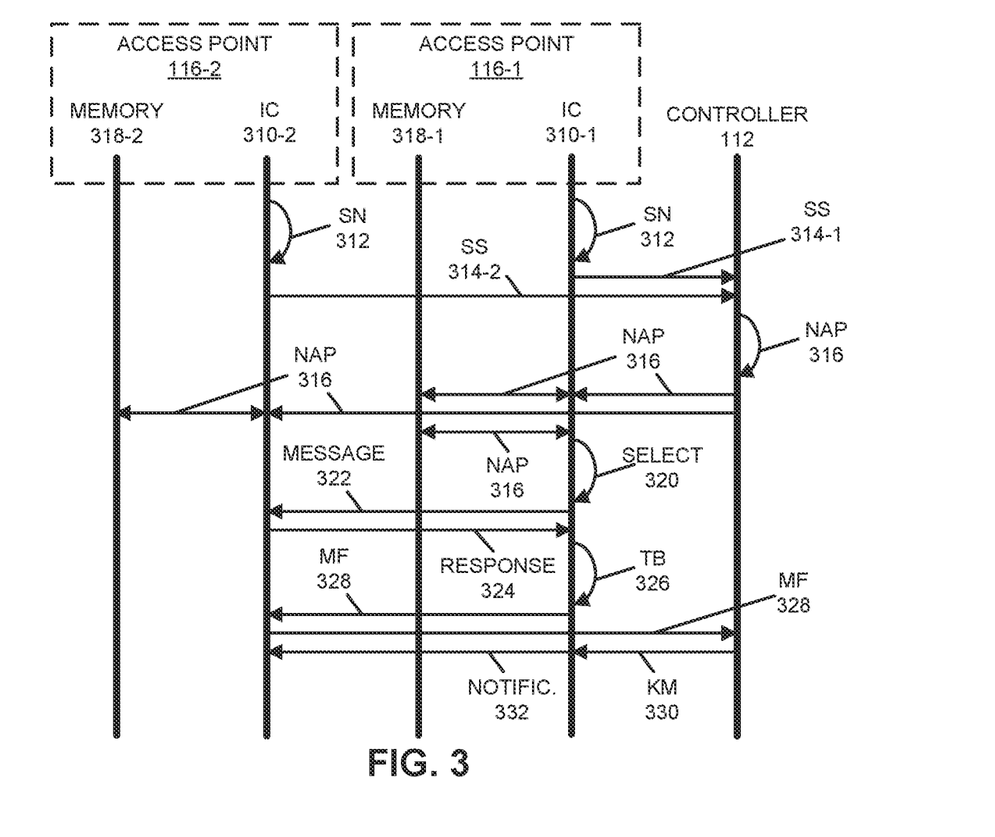
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among access point 116-1, access point 116-2 and controller 112. Interface circuits (ICs) 310 in access points 116 may each establish a standby network (SN) 312 having a SSID. Moreover, interface circuits 310 may each report measured received signal strengths (SS) 314 of access points that are within wireless range to controller 112.

After receiving the measured received signal strengths 314, controller 112 may determine a list of neighboring access points (NAP) 316 of each of access points 116. For example, the neighboring access points of a given access point may be those access points having received signal strengths exceeding a threshold, such as −90, −100, −110 or −120 dBm. Then, controller 112 may provide information specifying the neighboring access points 316 to access points 116. After receiving the information specifying the neighboring access points 316, interface circuits 310 may store this information in memory 318 in access points 116.

Subsequently, when interface circuit 310-1 is unable to communicate with controller 112, interface circuit 310-1 may access the information specifying the neighboring access points 316 in memory 318-1. Moreover, interface circuit 310-1 may select 320 access point 116-2 based at least in part on the neighboring access points 316. For example, access point 116-2 may have the strongest reception of signals from access point 116-1.

Next, interface circuit 310-1 may provide a message 322 (such as a page) to access point 116-2. After receiving message 322, interface circuit 310-2 may provide a response 324 to access point 116-1. Furthermore, after receiving response 324, interface circuit 310-1 may provide a transparent bridge (TB) 326 to access point 116-2 using the standby network. When operating or providing the transparent bridge 326, interface circuit 310-1 may forward, to access point 116-2, a management frame (MF) 328 addressed to controller 112. After receiving the management frame 328, interface circuit 310-2 may forward the management frame 328 to controller 112.

Additionally, controller 112 may subsequently provide a keepalive message (KM) 330 to access point 116-1. After receiving keepalive message 330, interface circuit 310-1 may determine that controller 112 is once again available. Consequently, interface circuit 310-1 may provide a notification 332 to access point 116-2 that indicates access point 116-1 is discontinuing providing the transparent bridge 326.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. The communication techniques may provide high-availability communication using dynamic transparent bridging. Notably, the access points in a wireless local area network may provide the high-availability communication by implementing a standby network having the SSID. The standby network may carry some or all of the traffic of the affected access points during a link failure. Note that the access points may be managed centrally by a controller. The controller may maintain a list of neighboring access points for the access points. Each neighbor of a given access point may be able to wirelessly page the given access point. Moreover, when requested, the standby network may be used to service any access point that is unable to communicate with the controller. However, clients of the access points may not be able to join the standby network.

When the access point misses one or more keepalive messages from the controller, the access point may select a neighboring access point (such as the closest access point or the neighboring access point with the strongest received signal strength). Then, the access point may page the neighboring access point to start the handover process.

Alternatively, when the controller misses one or more keepalive messages from the access point, the controller may select the neighboring access point (such as the closest access point or the neighboring access point with the strongest received signal strength). Then, the controller may page the neighboring access point. In response, the neighboring access point may contact the access point to start the handover process.

Note that the handover process may involve the access point dynamically taking over the role of a transparent wireless bridge. Notably, the access point may forward management traffic for the controller and/or traffic associated with clients of the access point to the neighboring access point via the standby network. The neighboring access point may forward this traffic on its network links. In this way, the access point and/or the clients may experience a minimal communication degradation or disruption.

For example, the access point may send management traffic to the neighboring access point, which then forwards the management traffic to the controller. The access point may continue to behave as a transparent bridge until the network/link issues are resolved and the controller is reachable. Once the access point is able to reach the controller via a network link(s), it may switch modes and forward data and/or management traffic over its network link(s). Alternatively, the controller may determine when it can communicate with the access point, and then may provide instructions to the access point and/or the neighboring access point to discontinue the transparent bridge.

In some embodiments, the standby network may carry or convey the fail-over data of multiple wireless networks having different SSIDs, which are supported by the access point. Consequently, the communication techniques may allow customers to ensure high availability in their wireless networks.

Figure 4:
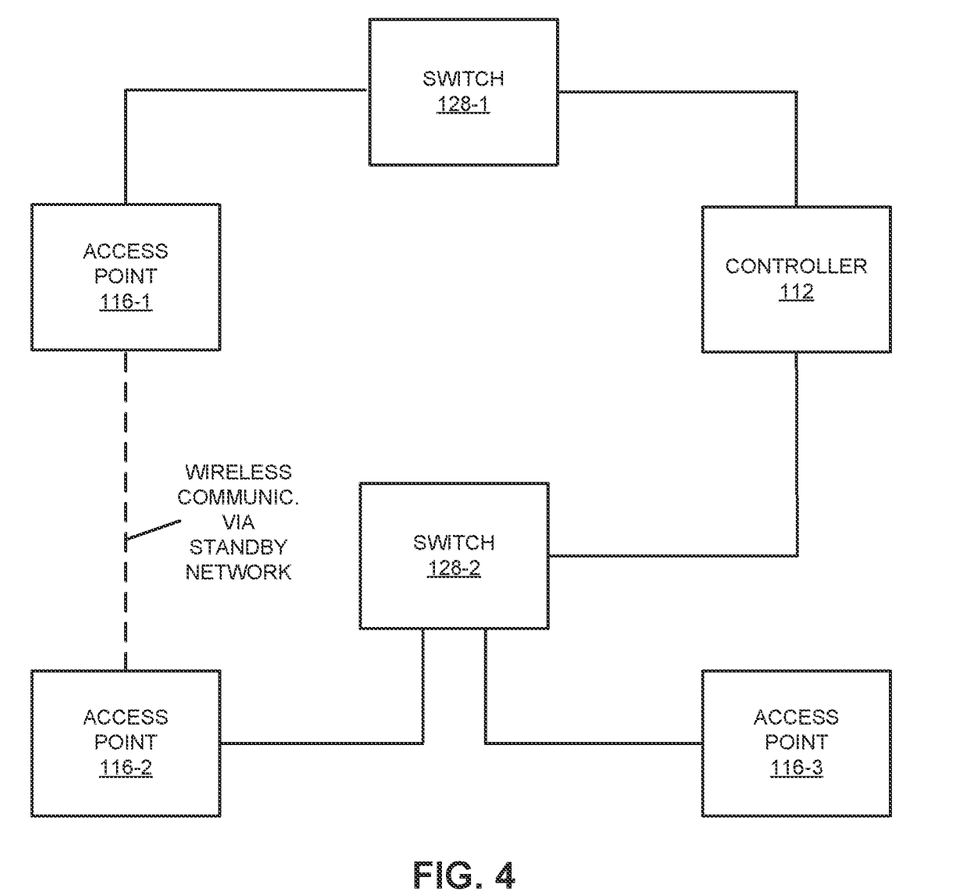
FIG. 4 is a drawing illustrating an example of communication among the electronic devices in FIG. 1 using a standby network in accordance with an embodiment of the present disclosure.

FIG. 4 presents a drawing illustrating an example of communication among access point 116-1, access point 116-2 and controller 112. As shown in FIG. 4, when access point 116-1 is unable to communicate with controller 112 (e.g., if switch 128-1 fails) or when controller is unavailable, access point 116-1 may transparently bridge traffic via access point 116-1 using the standby network having the SSID.

Figure 5:
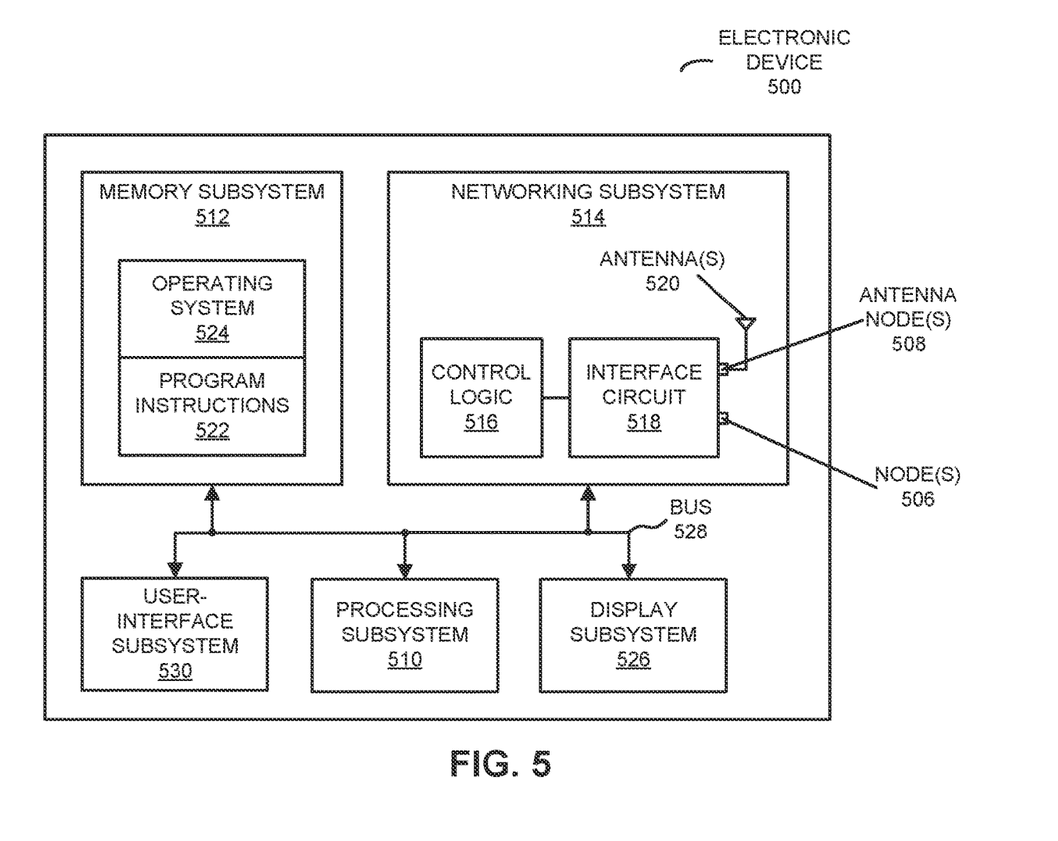
FIG. 5 is a block diagram illustrating an example of an electronic device in accordance with an embodiment of the present disclosure.

We now describe embodiments of an electronic device, which may perform at least some of the operations in the communication techniques. FIG. 5 presents a block diagram illustrating an example of an electronic device 500 in accordance with some embodiments, such as one of: base station 108, one of electronic devices 110, computer 112, one of access points 116, one of radio nodes 118, one of switches 128, or computer system 130. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include DRAM, static random access memory (SRAM), and/or other types of memory. In some embodiments, instructions for processing subsystem 510 in memory subsystem 512 include: one or more program modules or sets of instructions (such as program instructions 522 or operating system 524, such as Linux, UNIX, Windows Server, or another customized and proprietary operating system), which may be executed by processing subsystem 510. Note that the one or more computer programs, program modules or instructions may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a metal pad or a connector, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as directors or reflectors) and/or one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Moreover, electronic device 500 may include a user-interface subsystem 530, such as: a mouse, a keyboard, a trackpad, a stylus, a voice-recognition interface, and/or another human-machine interface. In some embodiments, user-interface subsystem 530 may include or may interact with a touch-sensitive display in display subsystem 526.

Electronic device 500 can be (or can be included in) any electronic device with at least one network interface. For example, electronic device 500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514 and/or of electronic device 500. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more interface circuits configured to communicate with a controller of the electronic device in a network and a second electronic device in the network, wherein the electronic device is configured to:
   establish a standby network having a selective service set identifier (SSID);
   receive, associated with the controller, information specifying neighboring electronic devices of the electronic device, wherein the neighboring electronic devices are within wireless communication range of the electronic device, and the neighboring electronic devices comprise the second electronic device;
   when the electronic device is unable to communicate with the controller, select the second electronic device in the neighboring electronic devices, wherein the second electronic device implements a second instance of the standby network having the SSID;
   provide a message addressed to the second electronic device;
   receive a response to the message associated with the second electronic device; and
   providing a transparent bridge with the second electronic device using the standby network, wherein the transparent bridge at least provides communication of management traffic between the electronic device and the controller via the second electronic device.

2. The electronic device of claim 1, wherein the electronic device comprises an access point.

3. The electronic device of claim 2, wherein the second electronic device comprises another access point.

4. The electronic device of claim 1, wherein the electronic device is configured to determine when the controller is unavailable based at least in part on one or more keepalive messages that are not received from the controller.

5. The electronic device of claim 1, wherein the electronic device is configured to perform a handover of traffic associated with one or more clients of the electronic device to the second electronic device; and
   wherein performing the handover comprises dynamically forwarding the traffic to the second electronic device using the standby network.

6. The electronic device of claim 1, wherein the electronic device is configured to reject a request associated with a third electronic device, which is different from an access point, to associate with the standby network.

7. The electronic device of claim 1, wherein, when the electronic device is able to communicate with the controller, the electronic device is configured to discontinue providing the transparent bridge.

8. A non-transitory computer-readable storage medium for use in conjunction with an electronic device, the computer-readable storage medium storing program instructions that, when executed by the electronic device, cause the electronic device to perform operations comprising:
   establishing a standby network having a selective service set identifier (SSID);
   receiving, associated with the controller, information specifying neighboring electronic devices of the electronic device, wherein the neighboring electronic devices are within wireless communication range of the electronic device, and the neighboring electronic devices comprise a second electronic device;
   when the electronic device is unable to communicate with the controller, selecting the second electronic device in the neighboring electronic devices, wherein the second electronic device implements a second instance of the standby network having the SSID;
   providing a message addressed to the second electronic device;
   receiving a response to the message associated with the second electronic device; and
   providing a transparent bridge with the second electronic device using the standby network, wherein the transparent bridge at least provides communication of management traffic between the electronic device and the controller via the second electronic device.

9. The non-transitory computer-readable storage medium of claim 8, wherein the electronic device comprises an access point; and wherein the second electronic device comprises another access point.

10. The non-transitory computer-readable storage medium of claim 8, wherein the operations comprise determining when the controller is unavailable based at least in part on one or more keepalive messages that are not received from the controller.

11. The non-transitory computer-readable storage medium of claim 8, wherein the operations comprise performing a handover of traffic associated with one or more clients of the electronic device to the second electronic device; and wherein performing the handover comprises dynamically forwarding the traffic to the second electronic device using the standby network.

12. The non-transitory computer-readable storage medium of claim 8, wherein the operations comprise rejecting a request associated with a third electronic device, which is different from an access point, to associate with the standby network.

13. The non-transitory computer-readable storage medium of claim 8, wherein, when the electronic device is able to communicate with the controller, the operations comprise discontinuing providing the transparent bridge.

14. A method for providing a transparent bridge, comprising:

by an electronic device:

establishing a standby network having a selective service set identifier (SSID);

receiving, associated with the controller, information specifying neighboring electronic devices of the electronic device, wherein the neighboring electronic devices are within wireless communication range of the electronic device, and the neighboring electronic devices comprise a second electronic device;

when the electronic device is unable to communicate with the controller, selecting the second electronic device in the neighboring electronic devices, wherein the second electronic device implements a second instance of the standby network having the SSID;

providing a message addressed to the second electronic device;

receiving a response to the message associated with the second electronic device; and providing the transparent bridge with the second electronic device using the standby network, wherein the transparent bridge at least provides communication of management traffic between the electronic device and the controller via the second electronic device.

15. The method of claim 14, wherein the electronic device comprises an access point.

16. The method of claim 15, wherein the second electronic device comprises another access point.

17. The method of claim 14, wherein the method comprises determining when the controller is unavailable based at least in part on one or more keepalive messages that are not received from the controller.

18. The method of claim 14, wherein the method comprises performing a handover of traffic associated with one or more clients of the electronic device to the second electronic device; and wherein performing the handover comprises dynamically forwarding the traffic to the second electronic device using the standby network.

19. The method of claim 14, wherein the method comprises rejecting a request associated with a third electronic device, which is different from an access point, to associate with the standby network.

20. The method of claim 14, wherein, when the electronic device is able to communicate with the controller, the method comprises discontinuing providing the transparent bridge.

* * * * *

UNITED STATES PATENT AND TRADEMARK OFFICE
CERTIFICATE OF CORRECTION

Page 1 of 1

PATENT NO. : 12,219,418 B2
APPLICATION NO. : 18/699028
DATED : February 4, 2025
INVENTOR(S) : Geethanjali Srinivas It is certified that error appears in the above-identified patent and that said Letters Patent is hereby corrected as shown below:

On the Title Page (71) Applicant: Please correct "ARRIS ENTERPRISES LLC, Suwanee, GA (US)" to read --Ruckus IP Holdings LLC, Claremont, NC (US)--

Signed and Sealed this
Second Day of September, 2025

Coke Morgan Stewart
*Acting Director of the United States Patent and Trademark Office*